United States Patent
Lukyanov

(10) Patent No.: US 7,969,501 B2
(45) Date of Patent: Jun. 28, 2011

(54) METHOD AND APPARATUS FOR AUTO-FOCUSING IN IMAGE SENSOR

(75) Inventor: Andrey Lukyanov, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 563 days.

(21) Appl. No.: 12/079,146

(22) Filed: Mar. 25, 2008

(65) Prior Publication Data

US 2008/0273869 A1    Nov. 6, 2008

(30) Foreign Application Priority Data

May 1, 2007   (KR) .................. 10-2007-0042318

(51) Int. Cl.
*G03B 13/00*   (2006.01)
(52) U.S. Cl. ............. 348/345; 348/222.1; 396/125
(58) Field of Classification Search .......... 348/345, 348/222.1; 396/125
See application file for complete search history.

(56) References Cited

U.S. PATENT DOCUMENTS

| 5,235,375 | A | * | 8/1993 | Yamana et al. | 396/101 |
| 5,452,005 | A |   | 9/1995 | Kubo et al. | 348/350 |
| 7,620,265 | B1 | * | 11/2009 | Wolff et al. | 382/276 |
| 2002/0197071 | A1 | * | 12/2002 | Hofer | 396/155 |

OTHER PUBLICATIONS

Korean Patent Application No. 1020040059496 to Jung et al., having Publication date of Feb. 3, 2006 (w/ English Abstract page).
Japanese Patent Application No. 04-309357 to Narimasa, having Publication date of May 20, 1994 (w/ English Abstract page).
Japanese Patent Application No. 2002-349870 to Manabu et al., having Publication date of Jul. 2, 2004 (w/ English Abstract page).

* cited by examiner

*Primary Examiner* — Jason Chan
*Assistant Examiner* — Usman Khan
(74) *Attorney, Agent, or Firm* — Monica H. Choi

(57) ABSTRACT

For auto-focusing of a focusing lens within an image sensing system, an N-bin luminance histogram is generated by a digital signal processor from an image. A microprocessor determines a type of the image from the N-bin luminance histogram. The microprocessor also determines a focus position using a first set of at least one focus value if the image is determined to be of a first type. The microprocessor also determines the focus position using a second set of at least one focus value different from the first set if the image is determined to be of a second type.

14 Claims, 19 Drawing Sheets

FIG. 5

|  | Y(x,y−1)<br>(P4) |  |
|---|---|---|
| Y(x−1,y)<br>(P2) | Y(x,y) | Y(x+1,y)<br>(P1) |
|  | Y(x,y+1)<br>(P3) |  |

FIG. 10A
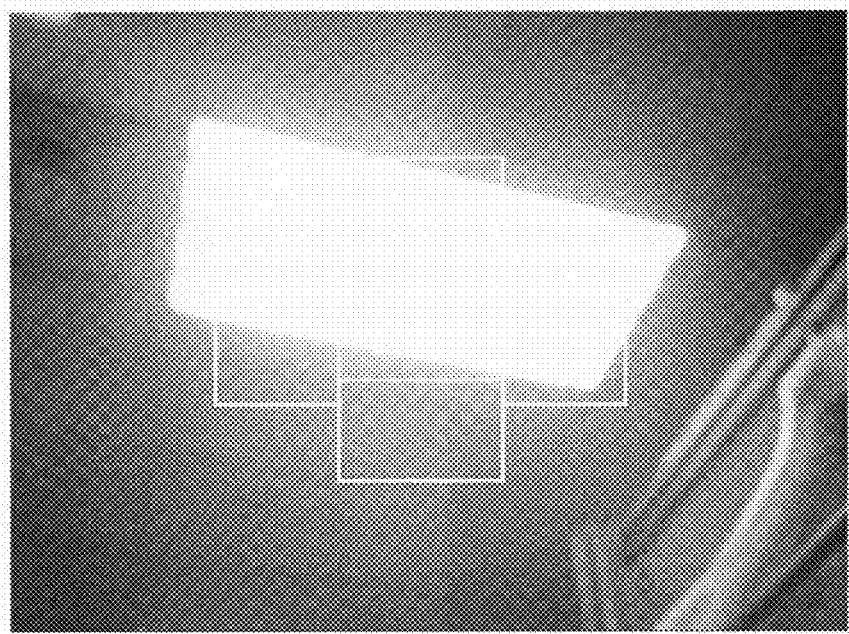
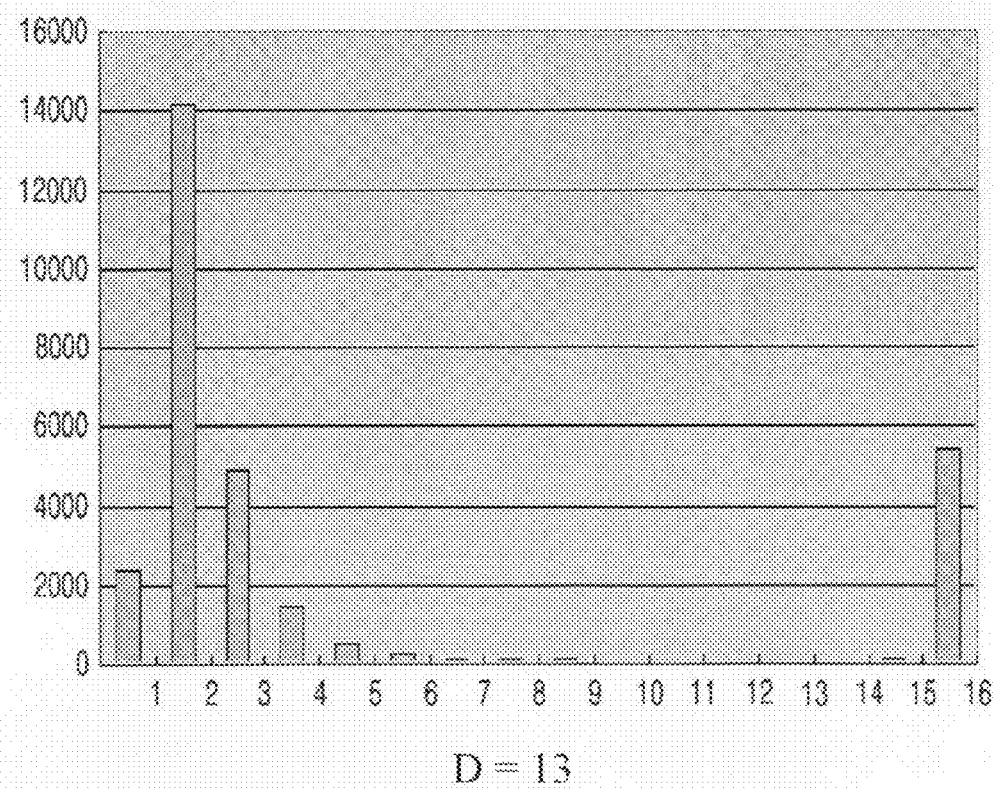
D = 13

FIG. 10B
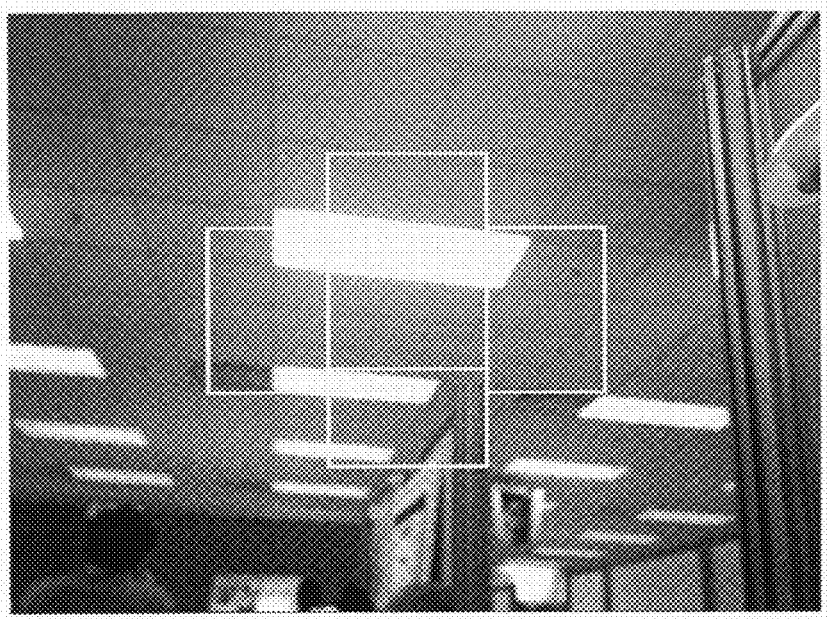
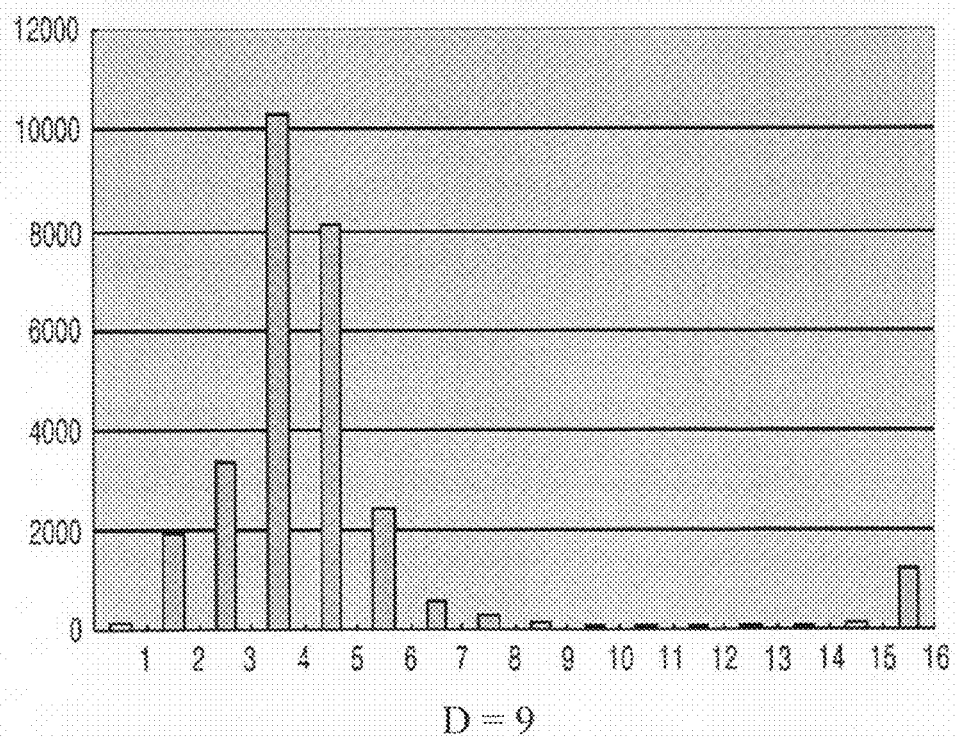
D = 9

FIG. 10C
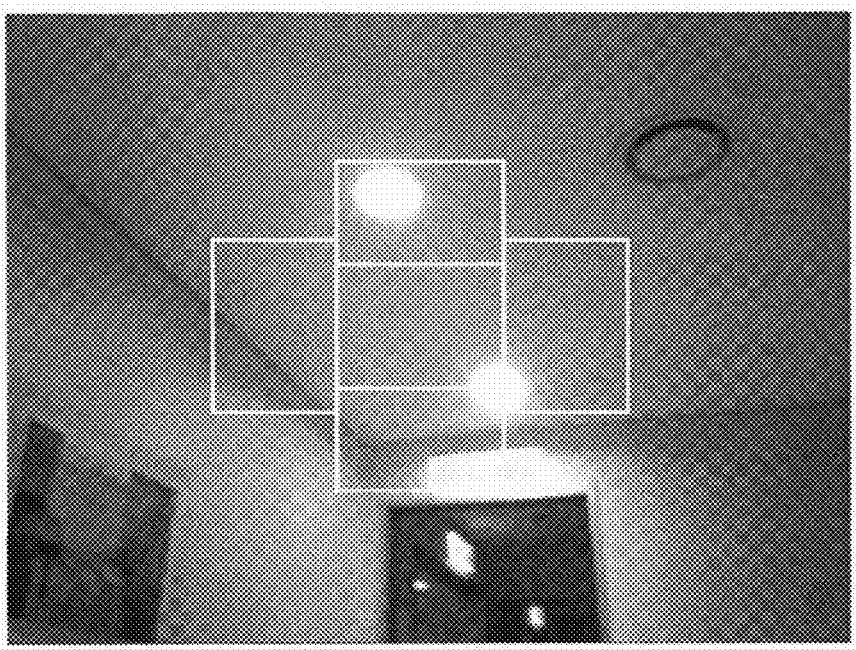
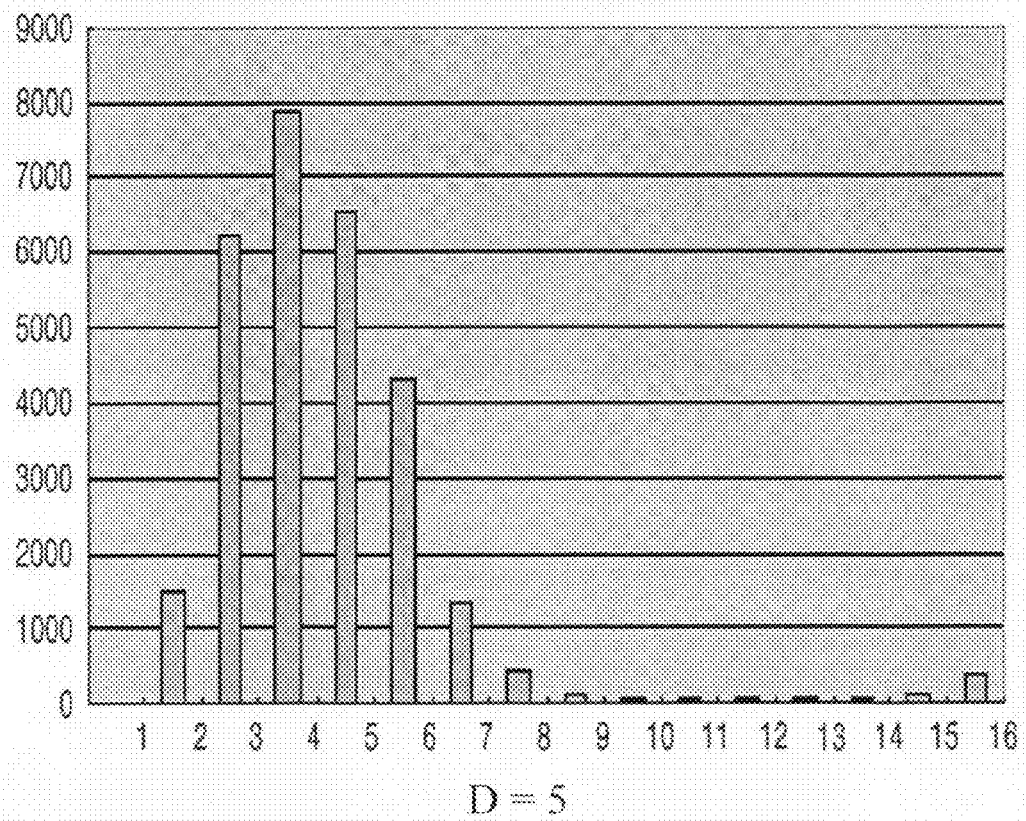
D = 5

FIG. 10D
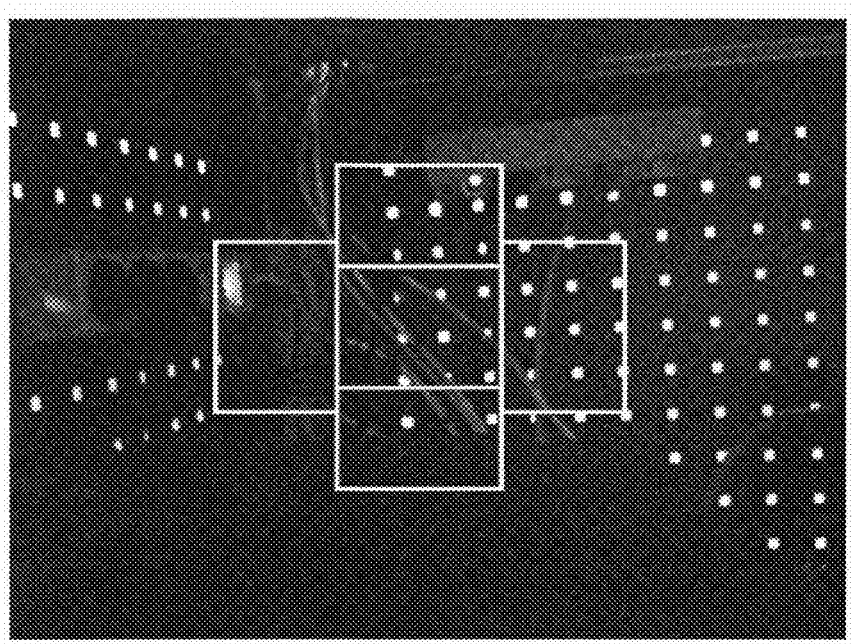
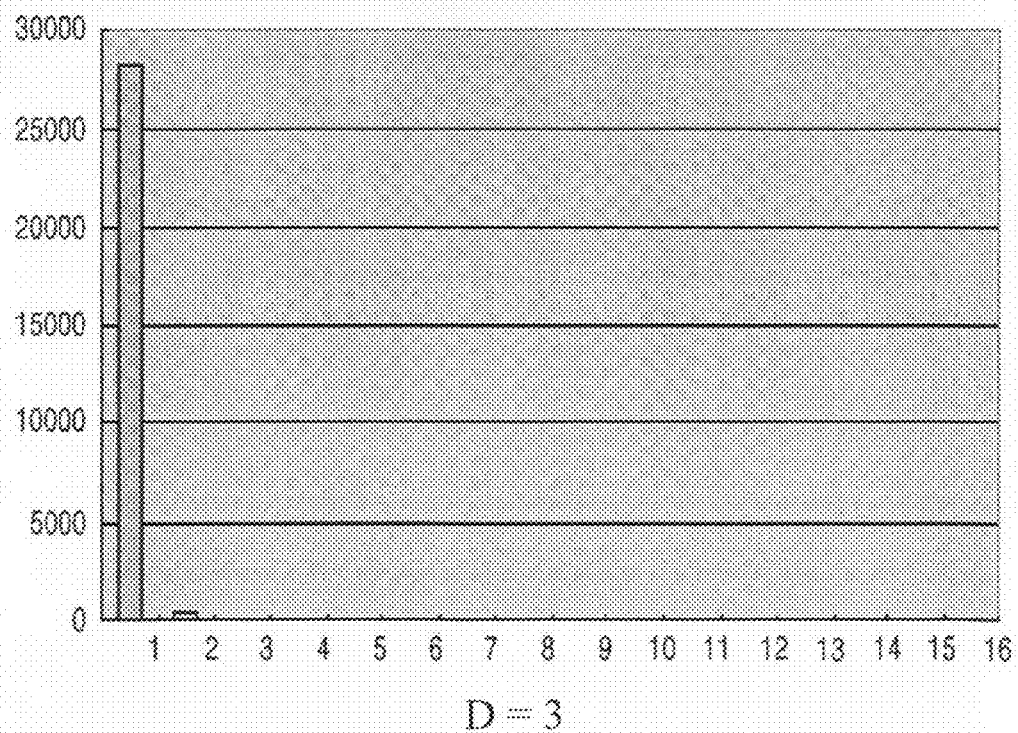
D = 3

FIG. 10E
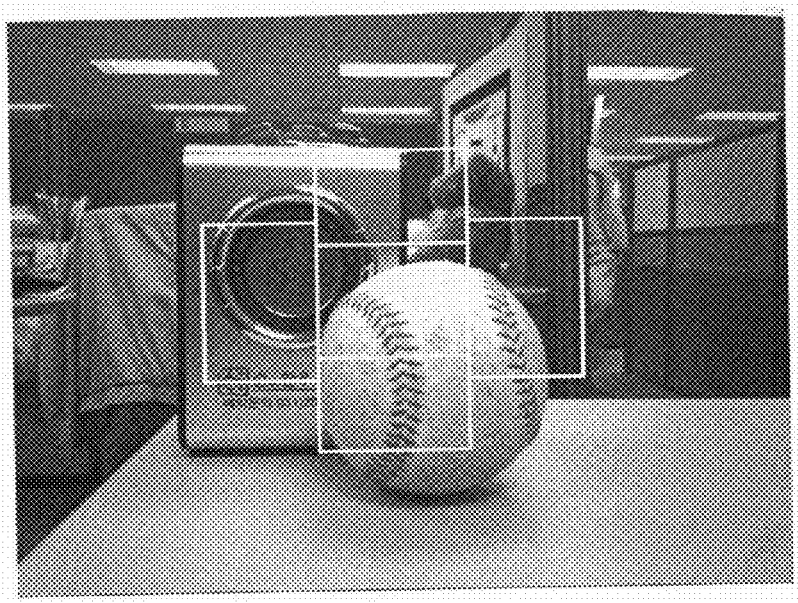
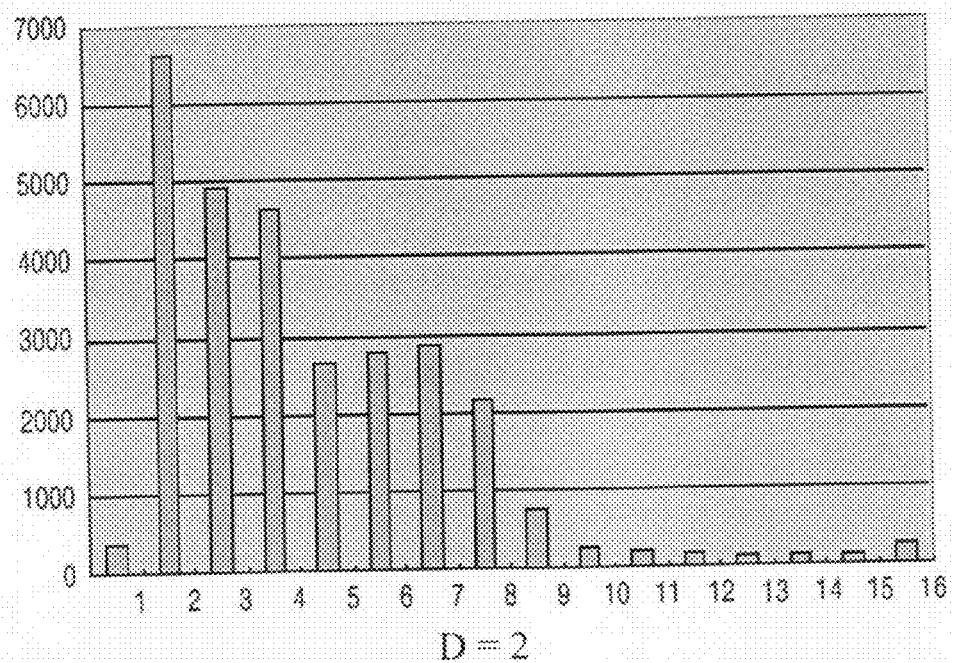
D = 2

METHOD AND APPARATUS FOR AUTO-FOCUSING IN IMAGE SENSOR

This application claims priority under 35 USC §119 to Korean Patent Application No. 2007-42318 filed on May 1, 2007 in the Korean Intellectual Property Office, the disclosure of which is incorporated herein in its entirety by reference.

BACKGROUND OF THE INVENTION

1. Field of the Invention

The present invention relates generally to automatic focusing control, and more particularly, to a method and apparatus for auto-focusing in an image sensor that accounts for a bright light source in an image.

2. Background of the Invention

Automatic focusing is now essential within image sensing systems such as digital cameras and mobile phones with a digital camera. In addition, the performance of an image sensing system is indicated by the accuracy and speed for driving a focusing or taking lens to an in-focus position in various environments.

For automatic focusing (i.e., auto-focusing), characteristics such as sharpness of an image captured by an image sensor are analyzed, and a focusing lens is moved to a position (e.g., an in-focus position) resulting in a maximum focus value. A focus value curve is used such that a clearest (i.e., in-focus) image is captured. The image sharpness information is high-frequency image signal information having a maximum value when the image is in-focus.

Generally, an image sensing system with auto-focusing determines a focus value from an image captured by an image sensor and analyzes the focus value for controlling the position of a focusing lens. Accordingly, accurate detection of the focus value is desired for in turn accurately controlling the position of the focusing lens.

However, accurate detection of a focus value is difficult for an image having low-contrast detail and saturated highlight area (e.g., an image including a light source) in a conventional image sensing system like a digital camera. In other words, the image sharpness information used to determine the focus value is significantly influenced by image noise and a saturated highlight area (e.g., a light source) included in the captured image.

Even when an image is generated with a light source, e.g., a glow lamp, a fluorescent lamp, or the sun being outside the in-focus image, the image of the light source includes strong edges which distort the image sharpness information. Accordingly, setting the focusing lens to the in-focus position is difficult for such an image including a light source in the conventional image sensing system.

SUMMARY OF THE INVENTION

In a method and apparatus for auto-focusing within an image sensing system, an N-bin luminance histogram is generated by a digital signal processor from an image. A microprocessor determines a type of the image from the N-bin luminance histogram. The microprocessor determines a focus position using a first set of at least one focus value if the image is determined to be of a first type. The microprocessor determines the focus position using a second set of at least one focus value different from the first set if the image is determined to be of a second type.

The microprocessor determines a K-th bin satisfying $$\sum_{i=K}^{N-1} H_i \geq H_N,$$

with $H_i$ being a respective histogram value for each i-th bin, and $H_N$ being a respective histogram value for the N-th bin that is for a brightest luminance.

The microprocessor determines a distance $D=(N-K)$ for the K-th and N-th bins, and determines that the image is of a highlight scene type if the distance D is greater than or equal to a reference value. Alternatively, the microprocessor determines that the image is of a normal scene type if the distance D is less than the reference value.

The microprocessor uses a gradient focus value generated from an output of a gradient filter for determining the focus position when the image is of the normal scene type. Alternatively, the microprocessor does not use the gradient focus value for determining the focus position when the image is of the highlight scene type.

When the image is of the normal scene type, the gradient focus value is not used for determining the focus position if the gradient focus value has a flat characteristic. In that case, a Laplacian focus value is used for determining the focus position if the gradient focus value has the flat characteristic. In addition, an optimal focus value is determined depending on characteristics of a plurality of Laplacian focus values for a plurality of image windows if the gradient focus value has the flat characteristic.

When the image is of the highlight scene type, the microprocessor determines an optimal focus value depending on characteristics of a plurality of Laplacian focus values for a plurality of smaller image windows. When all of the Laplacian focus values have flat characteristics, the microprocessor uses a characteristic of a number of non-saturated pixels in a larger image window.

The present invention may be used to particular advantage in an image sensing system including a focusing lens, a focus motor, an image sensor, the digital signal processor, and the microprocessor. The image sensor generates the image transmitted through the focusing lens. The focus motor moves the focusing lens, and the focus motor driver controls the focus motor to move the focusing lens to the focus position as determined by the microprocessor.

In this manner, the focus value used for determining the in-focus position is selected according to the type of image to account for any light source in the image. Thus, the focus value is accurately generated even when any light source is in the image.

BRIEF DESCRIPTION OF THE DRAWINGS

The above and other features and advantages of the present invention will become more apparent when described in detailed exemplary embodiments thereof with reference to the attached drawings in which:

FIG. 5 shows a 3×3 pixel array used in the AF filter of FIG. 4, according to an example embodiment of the present invention;

FIGS. 10A, 10B, 10C, 10D, and 10E show examples of images and corresponding N-bin luminance histograms determined according to an embodiment of the present invention;

The figures referred to herein are drawn for clarity of illustration and are not necessarily drawn to scale. Elements having the same reference number in FIGS. 1, 2, 3, 4, 5, 6, 7, 8, 9, 10, 11, 12, 13, 14, and 15 refer to elements having similar structure and/or function.

DETAILED DESCRIPTION OF THE INVENTION

Figure 1:
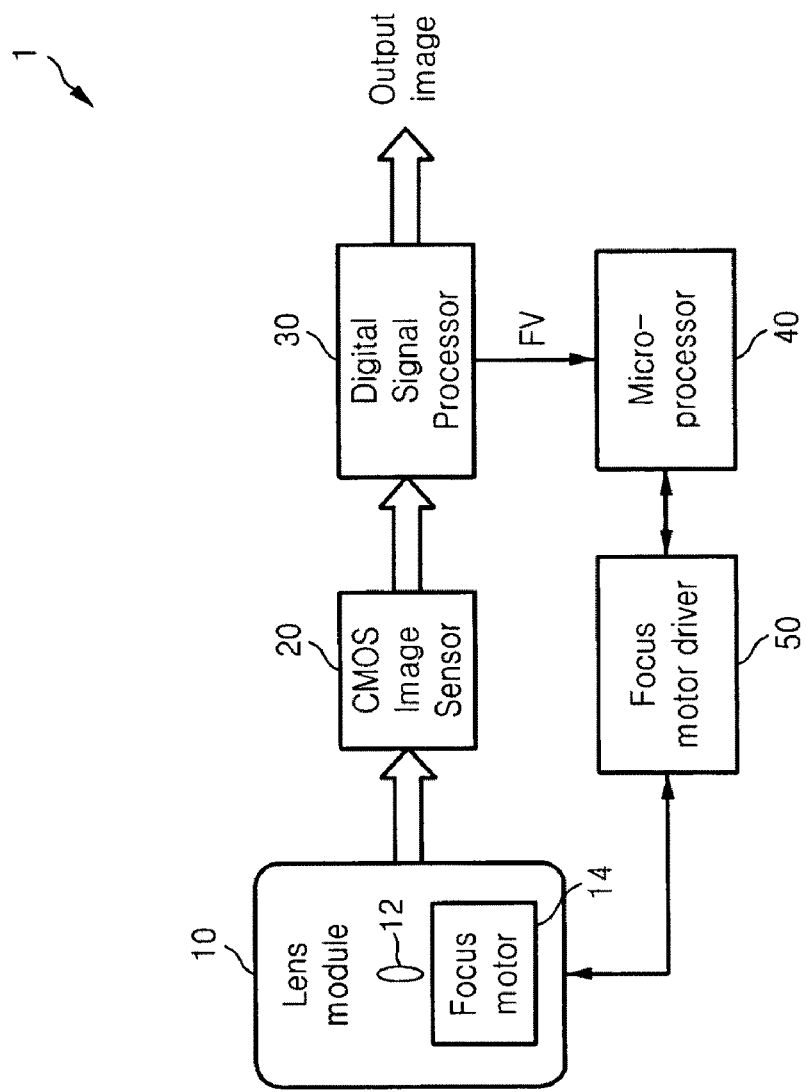
FIG. 1 is a block diagram of an image sensing system with auto-focusing, according to an embodiment of the present invention.

FIG. 1 is a block diagram of an image sensing system 1 with auto-focusing according to an embodiment of the present invention. The image sensing system 1 may be a digital still camera or a mobile phone including the digital still camera for example. The image sensing system 1 includes a lens module 10, an image sensor 20, a digital signal processor (DSP) 30, a microprocessor 40, and a focus motor driver 50.

The lens module 10 includes a focusing lens 12 which is also referred to as a taking lens. In addition, the lens module 10 includes a focus motor 14 driving the focusing lens to an in-focus position in response to a motor driving signal from the focus motor driver 50.

The image sensor 20 is implemented as a complementary metal oxide semiconductor (CMOS) image sensor according to an example embodiment of the present invention. The image sensor 20 captures an image transmitted through the focusing lens 12 to generate an electrical image or a captured image (31 in FIG. 2). The DSP 30 processes the image 31 captured by the image sensor 20.

Figure 2:
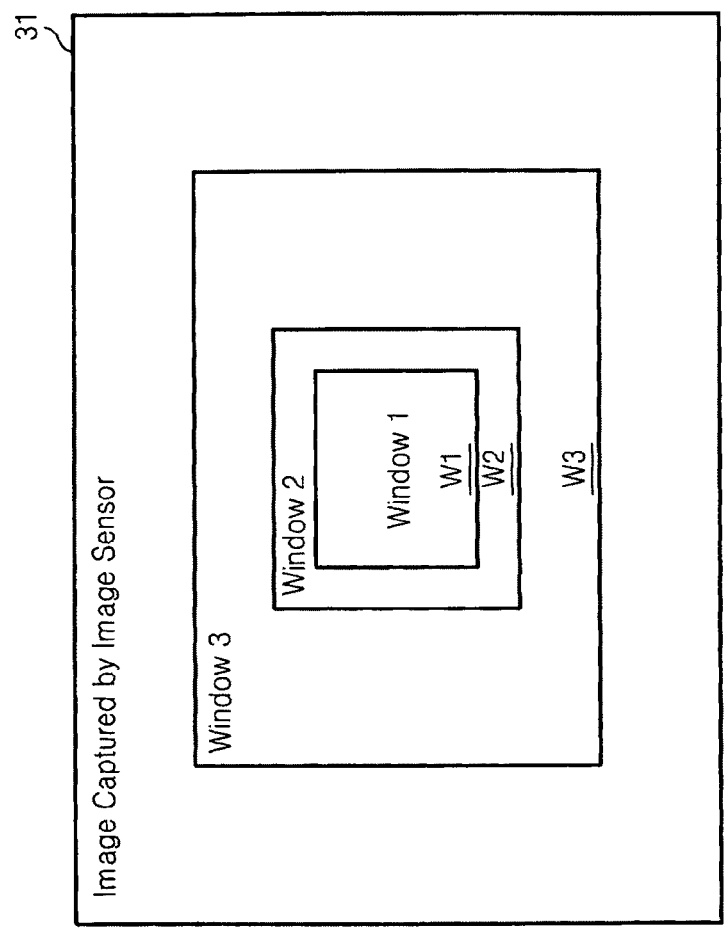
FIG. 2 illustrates auto-focus (AF) image windows of different sizes used in the image sensing system of FIG. 1, according to an embodiment of the present invention.

FIG. 2 shows the image 31 organized into a plurality of image windows W1, W2, and W3 used in the image sensing system 1 of FIG. 1. Referring to FIGS. 1 and 2, the DSP 30 extracts image sharpness information referred to as focus values (FV) from a plurality of image windows W1, W2, and W3 also referred to as AF windows. A largest image window W3 contains a smaller image window W2 that contains a smallest image window W1.

Figure 3:
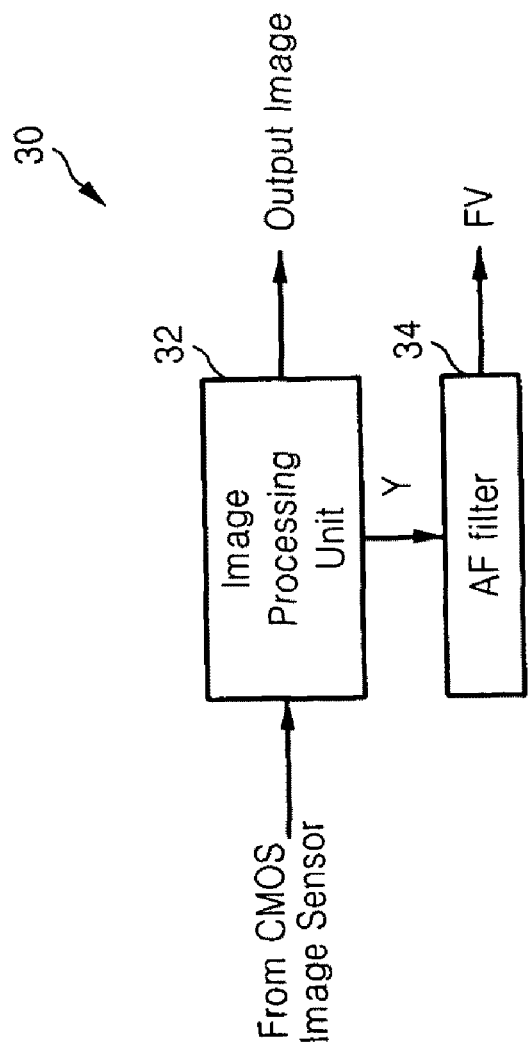
FIG. 3 is a functional block diagram of a digital signal processor (DSP) in the image sensing system of FIG. 1, according to an embodiment of the present invention.

The extraction of the image sharpness information or the calculation of the focus values (FV) is performed by an AF filter 34 as shown in FIG. 3, according to an example embodiment of the present invention. FIG. 3 shows the DSP 30 including an image processing unit 32 and the AF filter 34. The AF filter 34 uses image luminance signals generated by the image processing unit 32 for determining the image sharpness information of the AF windows W1, W2, and W3.

The microprocessor 40 determines the in-focus position of the focusing lens 12 using the image sharpness information FV from the DSP 30. The microprocessor 40 controls the focus motor driver 50 to generate a motor driving signal to the focus motor 14. The focus motor 14 moves the focusing lens 12 to the in-focus position in response to the motor driving signal.

The image processing unit 32 extracts luminance signals Y from the image signals generated by the image sensor 20. The AF filter 34 receives the luminance signals Y(x,y) corresponding to the pixels of the image sensor 20. Also, the image processing unit 32 performs color interpolation, scaling, and format transfer on the image captured by the image sensor 20 to generate an output image.

For each of the AF windows W1, W2, and W3 of FIG. 2, the AF filter 34 determines respective image sharpness information FV from the luminance signals Y(x,y) generated by the image processing unit 32. The image sharpness information FV includes at least one of a sum $F_G$ of output values $F_G'$ of a gradient filter 100 (FIG. 4), a sum $F_L$ of output values $F_L'$ of a Laplacian filter 120 (FIG. 4), the number $N_{NS}$ of non-saturated pixels in each of the AF windows W1, W2, and W3, and a sum $S_{NS}$ of luminance values of non-saturated pixels in each of the AF windows W1, W2, and W3.

The luminance corresponding to each pixel has a value or a level depending on a dynamic range of the luminance signal Y (e.g., ranging from 0 to 255 for example). A non-saturated pixel has a corresponding luminance value that is less than a predetermined luminance value (e.g., such as 230 in the range from 0 to 255 for example).

Figure 13:
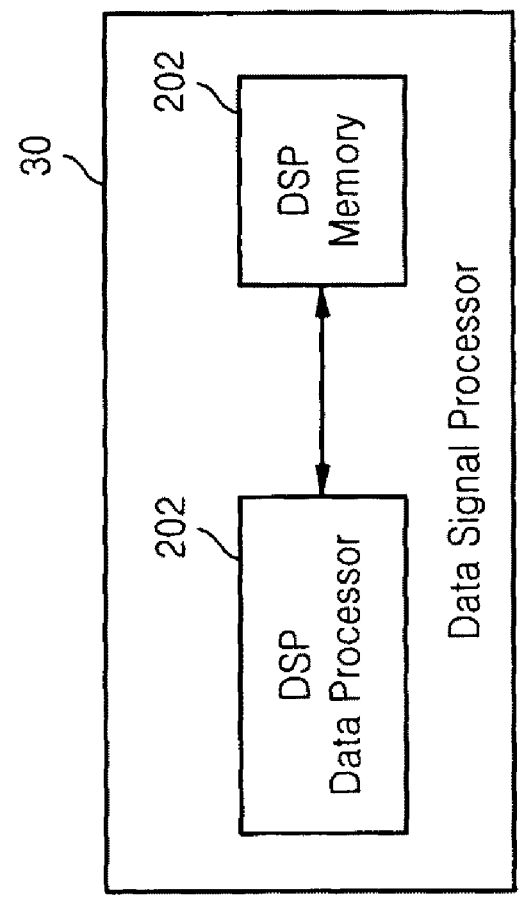
FIGS. 13 and 14 show block diagrams of the DSP and the microprocessor, respectively, in the image sensing system of FIG. 1, according to an embodiment of the present invention.

FIG. 13 shows a block diagram of the DSP 30 including a DSP data processor 202 and a DSP memory device 204 having sequences of instructions (i.e., software) stored thereon. Execution of such sequences of instructions by the DSP data processor 202 causes the DSP data processor 202 to perform the functions described for each of the components of FIG. 4 and steps S31, S32, and S33 of FIG. 15 according to an embodiment of the present invention.

Figure 14:
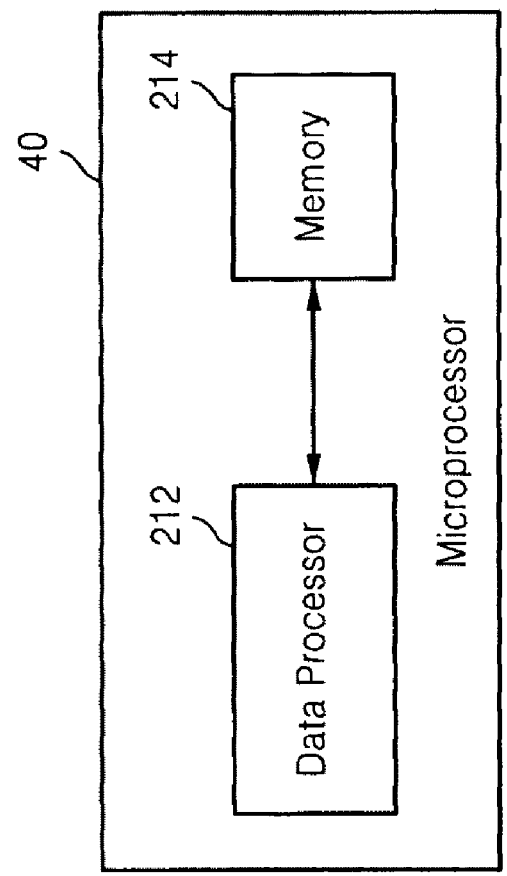

FIG. 14 shows a block diagram of the microprocessor 40 including a data processor 212 and a memory device 214 having sequences of instructions (i.e., software) stored thereon. Execution of such sequences of instructions by the data processor 212 causes the data processor 212 to perform steps of the flowchart of FIG. 8 and steps S34, S35, and S36 of FIG. 15 according to an embodiment of the present invention. Alternatively, the DSP data processor 202 and the data processor 212 may be implemented as one data processor, and the DSP memory device 204 and the memory device 214 may be implemented as one memory device.

Figure 4:
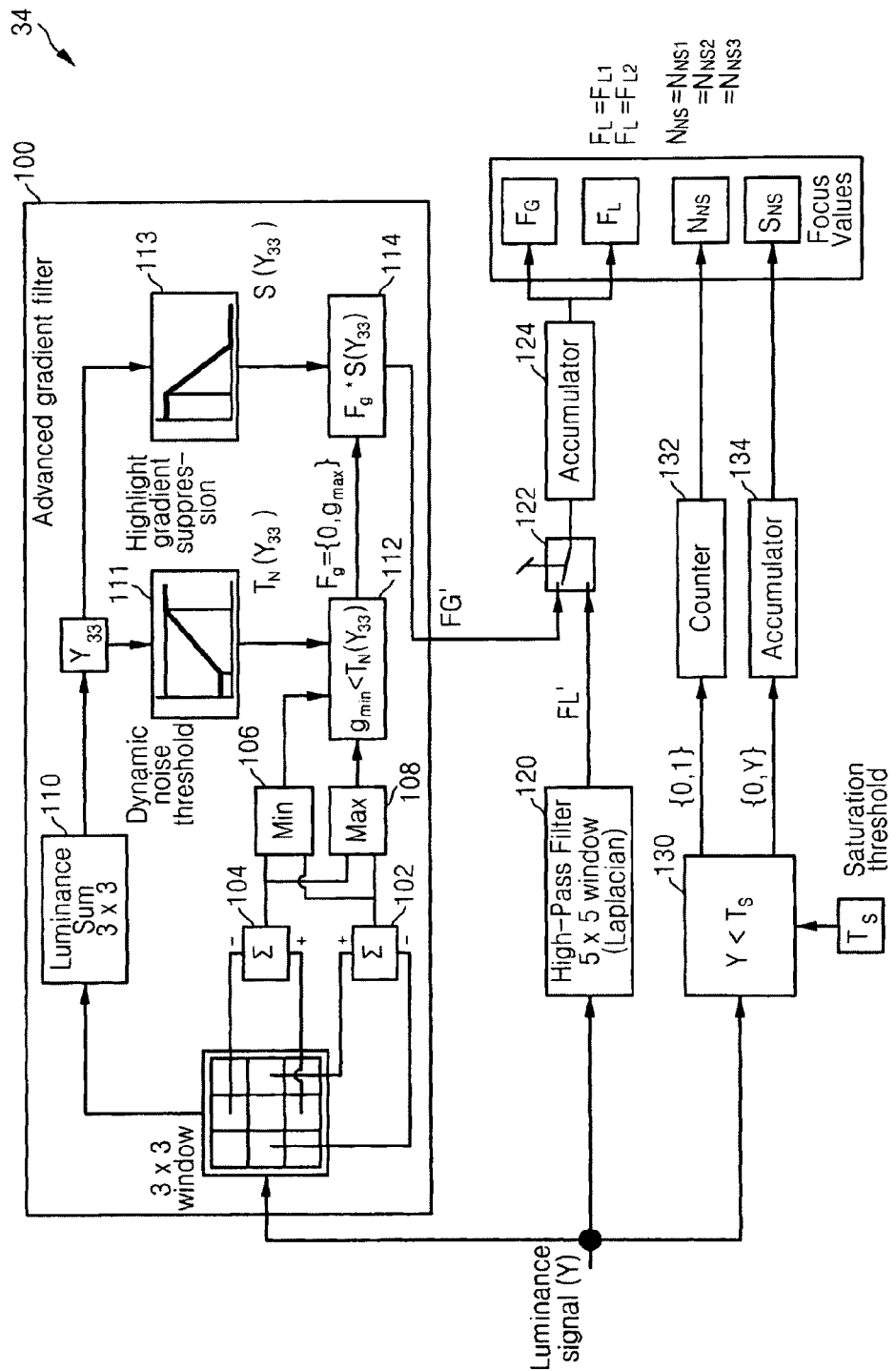
FIG. 4 is a functional block diagram of an AF (auto-focusing) filter in the DSP of FIG. 3, according to an embodiment of the present invention.

FIG. 4 shows a block diagram of the AF filter 34 of FIG. 3. The AF filter 34 includes the gradient filter 100, the high-pass Laplacian filter 120, a selector 122, a comparator 130, a counter 132, a first accumulator 124, and a second accumulator 134. The gradient filter 100 includes a first subtractor 102, a second subtractor 104, a minimum finder 106, a maximum finder 108, a luminance summer 110, a noise threshold determiner 111, an initial gradient focus value generator 112, a gradient suppression unit 113, and a final gradient focus value generator 114.

Operation of the DSP 30 and the microprocessor 40 of the image sensing system 1 is now described. The DSP 30 receives an image comprised of electrical signals from the CMOS image sensor 20 (step S31 of FIG. 15). The image processing unit 32 of the DSP 30 determines the luminance values Y(x,y) for each pixel location of the image generated by the CMOS image sensor 20 (step S32 of FIG. 15).

Subsequently, the AF filter 34 of the DSP 30 receives the luminance values Y(x,y) and generates the focus values (step S33 of FIG. 15). FIG. 4 shows components of the AF filter 34 for generating the focus values from the luminance values Y(x,y).

Figure 5:
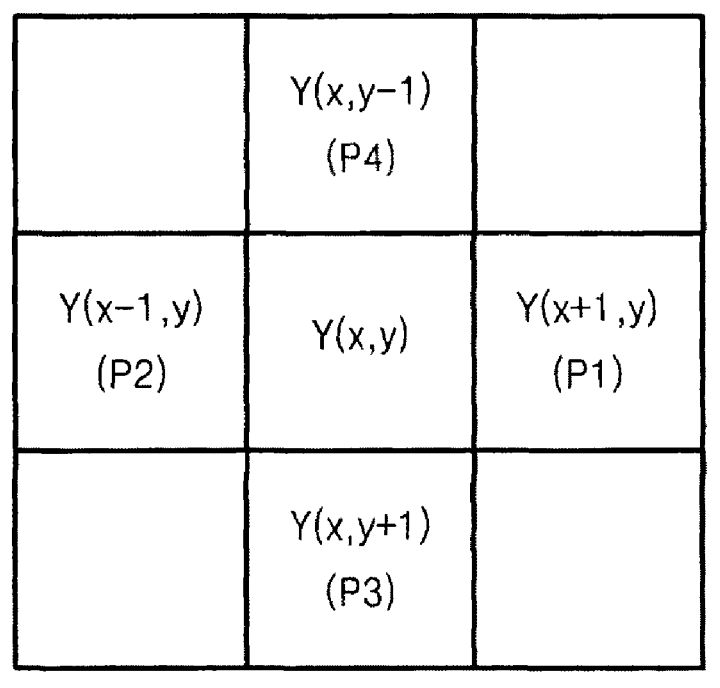

FIG. 5 shows example luminance values Y(x,y) for a 3×3 pixel array that is an example unit pixel area. The first subtractor 102 calculates a first difference $g_x$ between a luminance Y(x+1,y) of a first pixel P1 and a luminance Y(x−1,y) of a second pixel P2, according to the Equation (1) below. The second subtractor 104 calculates a second difference $g_y$ between a luminance Y(x,y+1) of a third pixel P3 and a luminance Y(x,y−1) of a fourth pixel P4, according to the Equation (1) below. The minimum finder 106 determines a minimum focus value $g_{min}$ between the first and second differences $g_x$ and $g_y$. The maximum finder 108 determines a maximum focus value $g_{max}$ between the first and second differences $g_x$ and $g_y$.

$$g_x = |Y(x+1, y) - Y(x-1, y)|, \quad (1)$$
$$g_y = |Y(x, y+1) - Y(x, y-1)|,$$
$$g_{min} = \min(g_x, g_y),$$
$$g_{max} = \max(g_x, g_y),$$
$$F_g = g_{max},$$

with Y(x,y) indicating the luminance of a pixel (x,y) of the CMOS image sensor 20.

In addition, the luminance summer 110 calculates a total luminance $Y_{33}$ of the image according to the Equation (2) below:

$$Y_{33} = \sum_{i=-1}^{1} \sum_{j=-1}^{1} Y(x+i, y+i). \quad (2)$$

Figure 6:
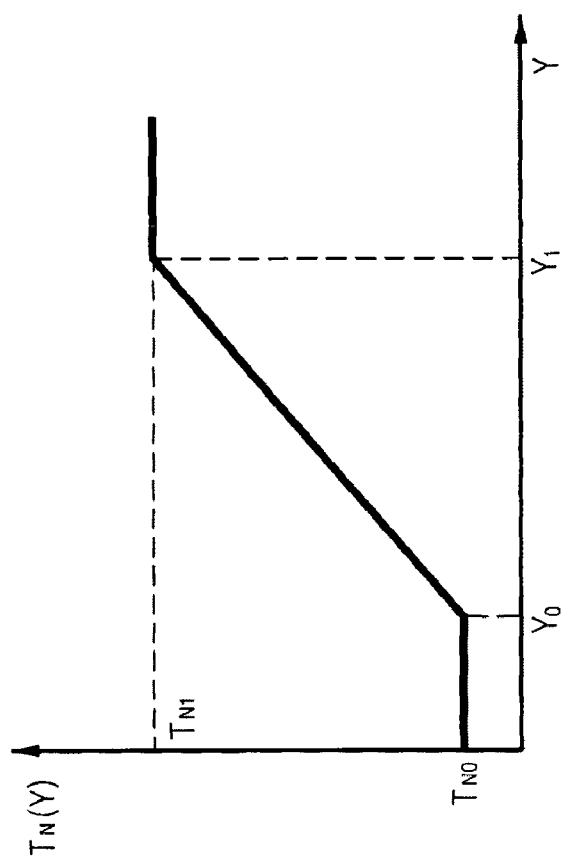
FIG. 6 shows a dynamic noise threshold function used in the AF filter of FIG. 4, according to an embodiment of the present invention.

FIG. 6 shows a dynamic noise threshold function $T_N(Y)$ used by the initial gradient focus value generator 112 in the AF filter 34 of FIG. 4. The dynamic noise threshold function $T_N(Y)$ is a plot of a variable threshold versus the total luminance $Y_{33}$, and the variable threshold $T_N(Y)$ is used by the initial gradient focus value generator 112 for removing noise from a gradient focus value $F_G'$ of the gradient filter 100.

Referring to FIGS. 4 and 6, the initial gradient focus value generator 112 determines the initial gradient focus value $F_g$ based on the minimum and maximum focus values $g_{min}$ and $g_{max}$, the total luminance $Y_{33}$, and the Equation (3) below:

$$T_N(Y) = \begin{cases} T_{N0}, & Y \leq Y_0 \\ T_{N0} + (T_{N1} - T_{N0})\dfrac{Y - Y_0}{Y_1 - Y_0}, & Y_0 < Y \leq Y_1, \\ T_{N1}, & Y > Y_1, \end{cases} \quad (3)$$

The noise threshold determiner 111 determines a dynamic noise threshold value $T_N(Y_{33})$ from a dynamic noise threshold function $T_N(Y)$ of FIG. 6 and the total luminance $Y_{33}$.

Accordingly, the initial gradient focus value generator 112 determines the initial gradient focus value $F_g = 0$ if $g_{min} < T_N(Y_{33})$ and $F_g = g_{max}$ if $g_{min} \leq T_N(Y_{33})$.

Figure 7:
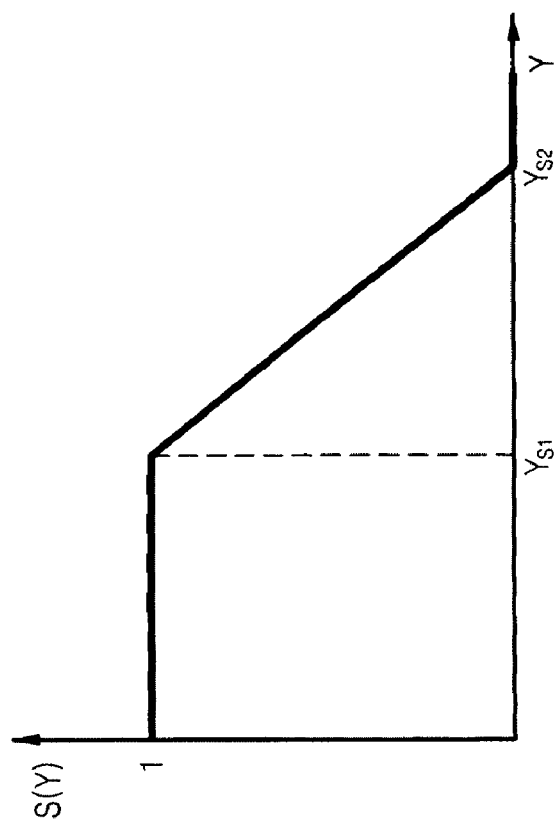
FIG. 7 shows a highlight gradient suppression function used in the AF filter of FIG. 4, according to an embodiment of the present invention.

The gradient suppression unit 113 determines a highlight gradient suppression value $S(Y_{33})$ from a highlight gradient suppression function $S(Y)$ of FIG. 7 and the total luminance $Y_{33}$.

The highlight gradient suppression function $S(Y)$ of FIG. 7 is defined as a function of a local image luminance and is used to suppress the focus value $F_G'$ as output by the gradient filter 100 at high-luminance areas in the captured image. The highlight gradient suppression function $S(Y)$ of FIG. 7 is defined as the following Equation (4) below:

$$S(Y) = \begin{cases} 1, & Y \leq Y_{S1}, \\ 1 - \dfrac{Y - Y_{S1}}{Y_{S2} - Y_{S1}}, & Y_{S1} < Y \leq Y_{S2}, \\ 0, & Y > Y_{S2}. \end{cases} \quad (4)$$

The final gradient focus value generator 114 generates the final gradient focus value $F_G'$ from the initial gradient focus value $F_g$ and the highlight gradient suppression value $S(Y_{33})$ at the total luminance $Y_{33}$, as expressed by Equation (5) below:

$$F_G' = 0, \text{ if } g_{min} < T_N(Y_{33})$$
$$F_G' = S(Y_{33}) * F_g, \text{ otherwise} \quad (5)$$

The high-pass filter 120 generates a Laplacian focus value $F_L'$ by multiplying the luminance signals Y of an m×m unit pixel area (where "m" is a natural number such as 5 for example) with a Laplacian high-pass kernel having coefficients such as shown in Equation (6) below for example:

$$\begin{bmatrix} -2 & -4 & -4 & -4 & -2 \\ -4 & 0 & 8 & 0 & -4 \\ -4 & 8 & 24 & 8 & -4 \\ -4 & 0 & 8 & 0 & -4 \\ -2 & -4 & -4 & -4 & -2 \end{bmatrix}. \quad (6)$$

The selector 122 selects one of the final gradient focus value $F_G'$ from the gradient filter 100 or the Laplacian focus value $F_L'$ from the high-pass filter 120 to the accumulator 124 in response to a selection signal. The accumulator 124 accumulates one of the focus values $F_G'$ or $F_L'$ from the selector 122 for a plurality of unit pixel areas.

For example, when the selector 122 selects the final gradient focus value $F_G'$, the accumulator 124 accumulates such values for the plurality of unit pixel areas to generate an accumulated gradient focus value $F_G$. When the selector 122 selects the Laplacian focus value $F_L'$, the accumulator 124 accumulates such values for the plurality of unit pixel areas to generate an accumulated Laplacian focus value $F_L$.

Also referring to FIG. 4, the accumulator 124 generates $F_{L1}$ that is the sum of the Laplacian focus values $F_L'$ from the high-pass filter 120 with respect to the second image window W2 of FIG. 2. In addition, the accumulator 124 generates $F_{L2}$ that is the sum of the Laplacian focus values $F_L'$ from the high-pass filter 120 with respect to the third image window W3 of FIG. 2.

The comparator 130 compares the luminance signals Y(x, y) with a luminance threshold $T_S$ to transmit the luminance signal Y(x,y) to the counter 132 when the luminance signal Y(x,y) is less than the luminance threshold $T_S$ such as when Equation (7) below is satisfied:

$$Y(x,y) < T_S \tag{7}$$

Accordingly, the counter 132 counts a number of pixels $N_{NS}$ having the luminance Y(x,y) satisfying Equation (7) above.

The pixel count $N_{NS}$ of the counter 132 includes the numbers $N_{NS1}$, $N_{NS2}$, and $N_{NS3}$ of non-saturated pixels in the image windows W1, W2, and W3, respectively. In addition, when the luminance value Y(x,y) is less than the luminance threshold $T_S$, the comparator 130 transmits the luminance signal Y(x,y) to the accumulator 134. Accordingly, the accumulator 134 accumulates the luminance values Y(x,y) of the non-saturated pixels to generate a luminance sum $S_{NS}$ of the luminance values Y(x,y) of the non-saturated pixels.

Referring to FIGS. 2 and 4, the image sensing system 1 according to an example embodiment of the present invention uses the three image windows W1, W2, and W3. However, the present invention may be practiced with less or more image windows. In an example embodiment of the present invention, the first and second image windows W1 and W2 within the captured image are used as main focusing windows.

In that case, the third image window W3 is used as a backup window when the first and second image windows W1 and W2 do not generate satisfactory focus values. For example, when a strong highlight (e.g., a light source) exists in the first and second image windows W1 and W2, the third image window W3 may be used as the backup window.

In an example embodiment of the present invention, the DSP 30 outputs the focus value FV for use by the microprocessor 40 as follows. With respect to the first image window W1, the DSP 30 outputs to the microprocessor 40 the gradient focus value $F_G$ accumulated by the accumulator 124 and the pixel count $N_{NS1}$ for the first image window W1 from the counter 132.

With respect to the second image window W2, the DSP 30 outputs to the microprocessor 40 the Laplacian focus value $F_{L1}$ generated by the accumulator 124 for the second image window W2 and the pixel count $N_{NS2}$ for the second image window W2 from the counter 132. With respect to the third image window W3, the DSP 30 outputs to the microprocessor 40 the Laplacian focus value $F_{L2}$ generated by the accumulator 124 for the third image window W3 and the pixel count $N_{NS3}$ for the third image window W3 from the counter 132.

When the focus values $F_G$ and $F_{L1}$ for the first and second image windows W1 and W2 are not reliable such as when the in-focus position cannot be determined from such focus values $F_G$ and $F_{L1}$, the focus value $F_{L2}$ for the third image window W3 is used as a backup for determining the in-focus position. In addition, when the focus values $F_G$ and $F_{L1}$ are not reliable because a saturated highlight area (e.g., light source) exists in the first and second image windows W1 and W2, the pixel count $N_{NS3}$ for the third image window W3 is used for determining the in-focus position.

Figure 8:
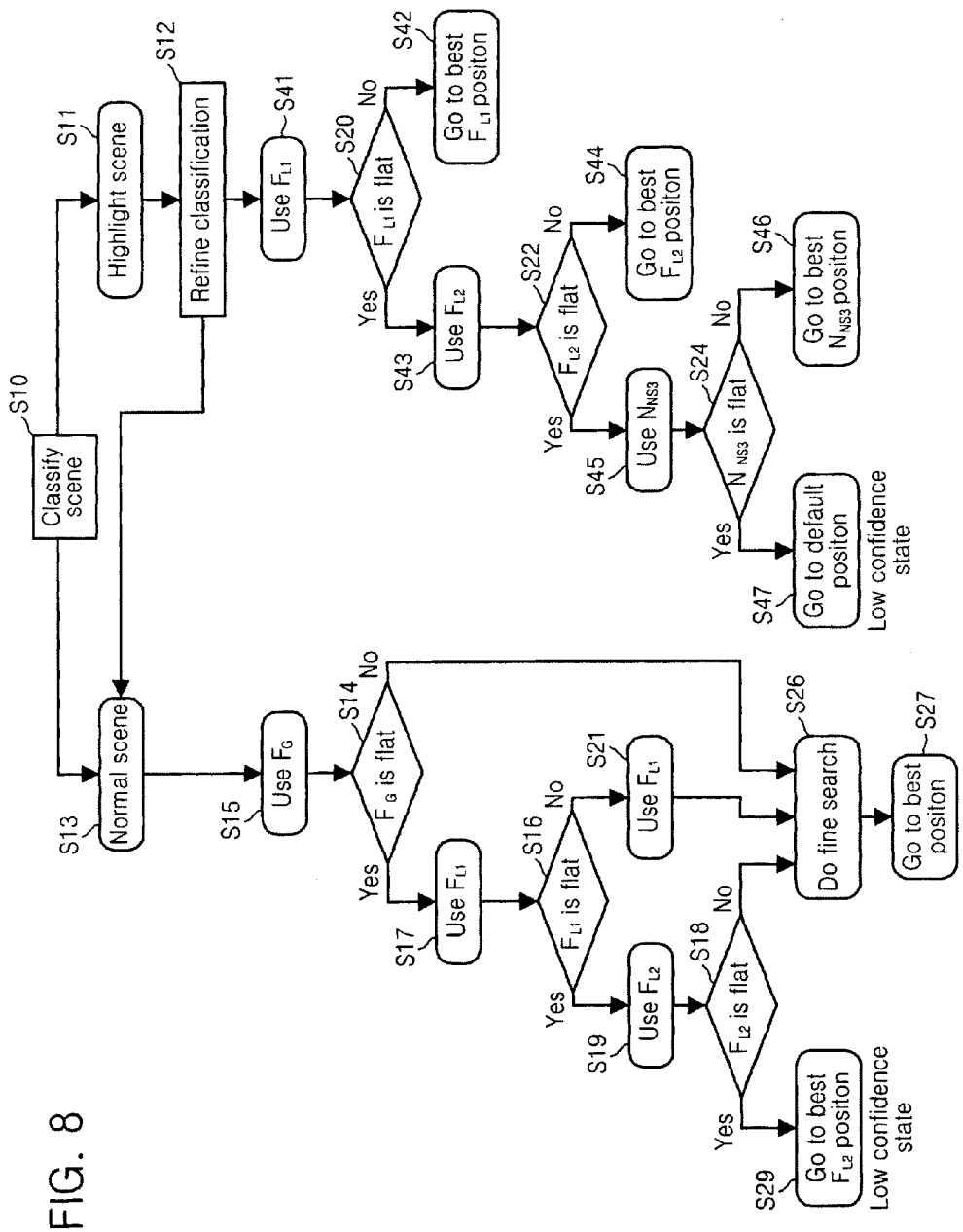
FIG. 8 shows a flowchart of an auto-focusing method performed by a microprocessor in the image sensing system of FIG. 1, according to an embodiment of the present invention.

FIG. 8 shows a flowchart of steps performed by the microprocessor 40 for performing auto-focusing according to an example embodiment of the present invention. The microprocessor 40 generates an N-bin luminance histogram from the luminance values Y(x,y) for the image (step S34 of FIG. 15) for classifying a type of scene of the image (step S35 of FIG. 15 and step S10 of FIG. 8).

Figure 9:
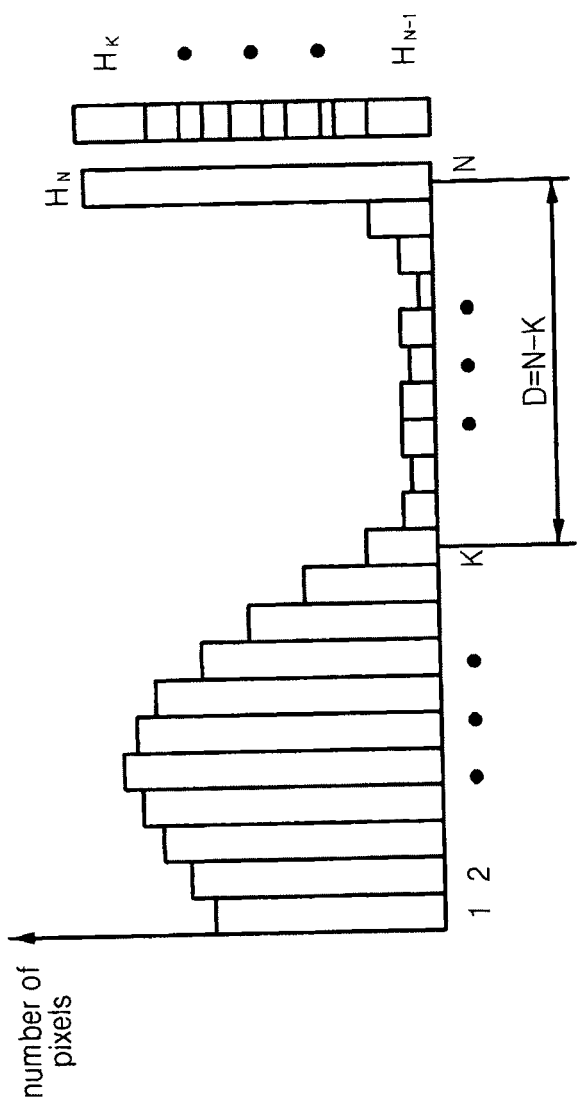
FIG. 9 shows an N-bin luminance histogram determined by the DSP in the image sensing system of FIG. 1, according to an embodiment of the present invention.

FIG. 9 shows an example of such an N-bin luminance histogram with the x-axis indicating a luminance level and the y-axis being the number of pixels at the luminance level of the x-axis. The present invention may be practiced with either one of the DSP 30 or the microprocessor 40 generating the N-bin luminance histogram for the image captured by the image sensor 20.

In addition for determining the image type, the microprocessor 40 calculates a distance D between an N-th bin and a K-th bin (with N and K being respective natural numbers and with K<N) from the N-bin luminance histogram. The N-th bin is for the highest luminance level in the N-bin luminance histogram. In addition, the microprocessor 40 determines the K-th bin as satisfying Equation (8) below:

$$\sum_{i=K}^{N-1} H_i \geq H_N \tag{8}$$

where $H_i$ is the histogram value (e.g., the number of pixels) at an i-th bin (i=1, 2, . . . , N), and $H_N$ is a histogram value (e.g., the number of pixels) at the N-th bin.

In an example embodiment of the present invention, $H_N$ indicates the number of saturated pixels in the captured image with the N-th bin being for the highest luminance levels of the N-bin luminance histogram. After determining N and K, the microprocessor 40 calculates a distance D between N and K according to the following Equation (9):

$$D = (N-K). \tag{9}$$

The distance D for an image having a saturated highlight area (such as from including a light source) is greater than a distance D for an image not having a saturated highlight area. For example, FIGS. 10A, 10B, and 10C each have relatively high D values such as D=13, D=9, and D=5, respectively, since such FIGS. 10A, 10B, and 10C capture images with a saturated highlight area from a large light source. In contrast, FIGS. 10D and 10E each have relatively low D values such as D=3 and D=2, respectively, since such FIGS. 10D and 10E capture images without a saturated highlight area.

Figure 15:
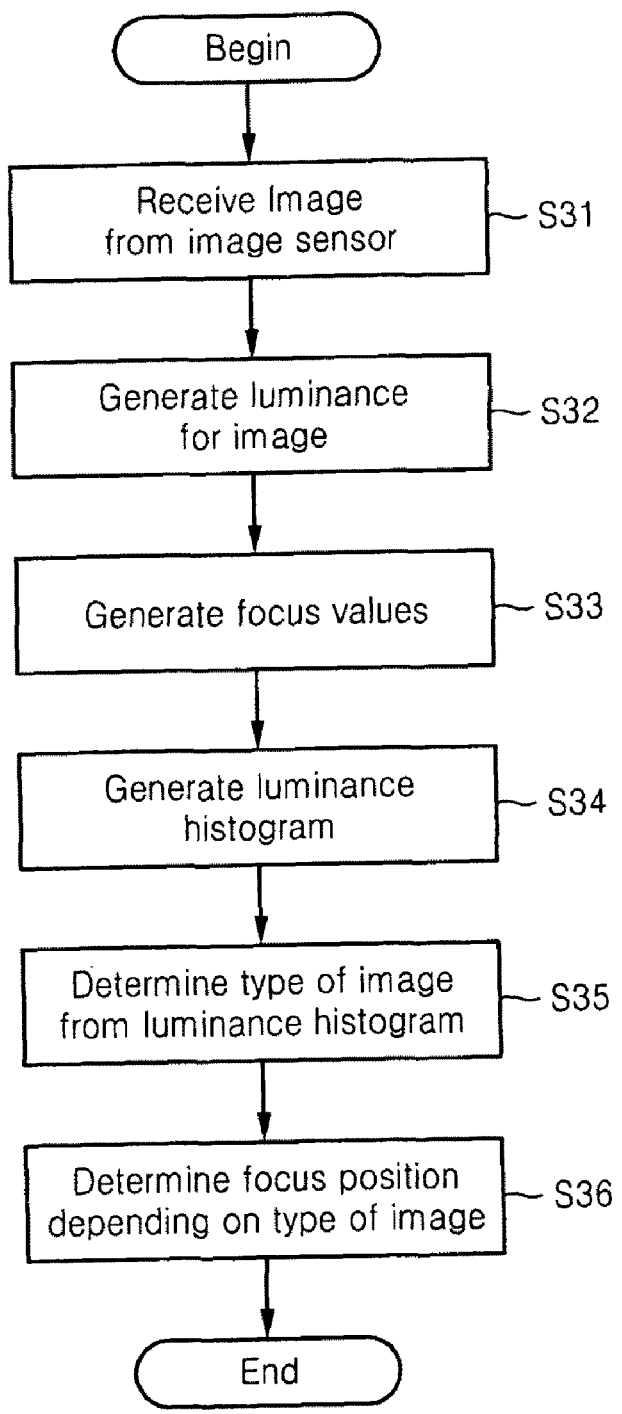
FIG. 15 shows a flowchart of steps performed by the DSP and the microprocessor in the image sensing system of FIG. 1, according to an embodiment of the present invention.

The microprocessor 40 compares the distance D for an image with a reference value TD for classifying such an image into a normal scene type or a highlight scene type (step S10 of FIG. 8 and step S35 of FIG. 15). For example, when the distance D is equal to or greater than the reference value TD, the captured image is classified into the highlight scene type (such as the images of FIGS. 10A, 10B, and 10C for example) (step S11 in FIG. 8). Alternatively when the distance D is less than the reference value TD, the captured image is classified into the normal scene type (such as the image of FIGS. 10D and 10E for example) (step S13 in FIG. 8).

Figure 11:
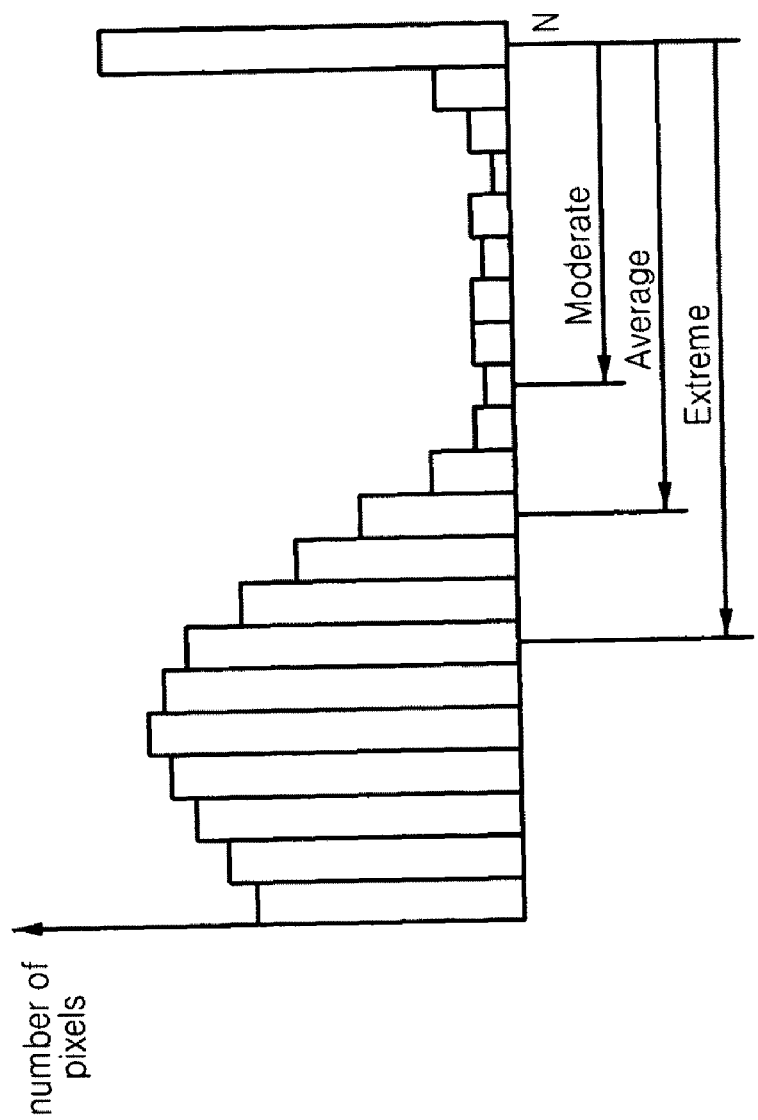
FIG. 11 shows another example N-bin luminance histogram for explaining classification of an image type, according to an embodiment of the present invention.

The present invention may also be practiced when a captured image is classified into more than two types by comparing the distance D with a plurality of reference values. For example, FIG. 11 shows classification of an image into three types (moderate, average, or extreme) by comparing the distance D for the image with two reference values.

Referring back to FIG. 8, when the captured image is classified as the normal scene type, the microprocessor 40 uses the accumulated gradient focus value $F_G$ and the accumulated Laplacian focus values $F_{L1}$ and $F_{L2}$ generated for at least one of the image windows W1, W2, and W3 when determining the in-focus lens position of the focusing lens 12. Alternatively when the captured image is classified into the highlight scene type, the microprocessor 40 uses the accumulated Laplacian focus values $F_{L1}$ and $F_{L2}$ and the pixel count $N_{NS3}$ for at least one of the image windows W1, W2, and W3 when determining the in-focus lens position of the focusing lens 12.

In an alternative embodiment of the present invention, when the image is classified into the highlight scene type, the microprocessor 40 refines the highlight scene classification from the pixel count of the non-saturated pixels $N_{NS1}$ or $N_{NS2}$ of the first or second image window W1 or W2 (step S12 of FIG. 8). For example, the microprocessor 40 may re-classify an image from the highlight scene type to the normal scene type when the following Equation (10) below is satisfied (step S12 of FIG. 8):

$$(N_{W2} - N_{NS2}) < T_R \tag{10}$$

where $N_{W2}$ is the number of pixels in the second image window W2 and $T_R$ is a reference value. The reference value $T_R$ is a tolerable number of saturated pixels which would not significantly affect the image sharpness information (e.g., focus values) for the second image window W2.

Figure 12:
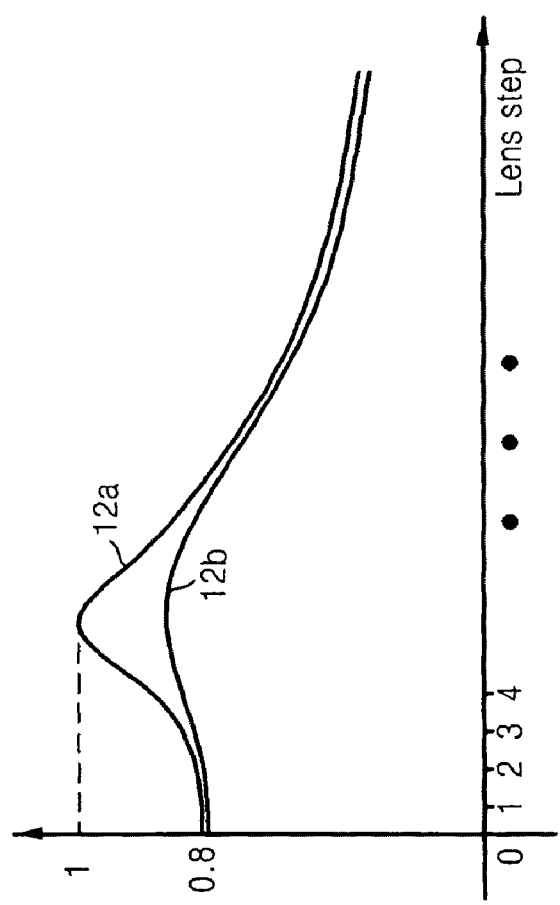
FIG. 12 shows normalized focus value curves used in the image sensing system of FIG. 1, according to an embodiment of the present invention.

FIG. 12 shows normalized focus value curves used in an embodiment of the present invention. Such a focus value curve is determined by the microprocessor 40 driving the focusing lens 12 to a plurality of lens positions via the focus motor driver 50. The x-axis in FIG. 12 is the lens position, and the y-axis of FIG. 12 indicates the corresponding focus value determined for each lens position. For example, such focus value may be the accumulated gradient focus value $F_G$, or one of the accumulated Laplacian focus values $F_{L1}$ and $F_{L2}$, or the non-saturated pixel count $N_{NS3}$. The in-focus lens position at the maximum optimal focus value is determined according to the normalized focus value curve. Such an operation is referred to as a coarse search.

For each focus value $FV = F_G, F_{L1}, F_{L2}$ or $N_{NS3}$, the microprocessor 40 determines the following information: a maximum focus value, a lens position that corresponds to the maximum focus value, a minimum focus value, a sum of focus values, and number of focus values in the sum. The microprocessor 40 uses such focus value information to determine the in-focus lens position and to determine whether the corresponding focus value curve is flat. The microprocessor 40 determines whether each focus value curve is flat based on Equation (11) below:

$$\frac{\sum_{i=1,\ldots,N} F(i)}{N \max(F(i))} > T_C \tag{11}$$

where $F(i)$ is a focus value of an i-th step of a coarse search, $N$ is the number of steps in the coarse step, and $T_C$ is a threshold.

Referring to FIG. 8, when the captured image is classified as the normal scene type, the microprocessor 40 analyzes whether the shape of the accumulated gradient focus value curve $F_G$ of the first image window W1 is flat (steps S15 and S14 in FIG. 8). If such focus value curve $F_G$ is not flat (such as a curve 12*a* in FIG. 12 for example), the microprocessor 40 uses the accumulated gradient focus value curve $F_G$ for determining the in-focus position of the focusing lens at the peak of such a non-flat curve $F_G$ (steps S26 and S27 in FIG. 8).

If such focus value curve $F_G$ is flat (such as the curve 12*b* in FIG. 12 for example) (step S14 of FIG. 8), the microprocessor 40 analyzes whether the accumulated Laplacian focus value curve $F_{L1}$ for the second image window W2 is flat (steps S17 and S16 of FIG. 8). If such focus value curve $F_{L1}$ is not flat (such as the curve 12*a* in FIG. 12 for example), the microprocessor 40 uses the accumulated Laplacian focus value curve $F_{L1}$ for determining the in-focus position of the focusing lens at the peak of such a non-flat curve $F_{L1}$ (steps S21, S26, and S27 in FIG. 8).

If such focus value curve $F_{L1}$ is flat (such as the curve 12*b* in FIG. 12 for example) (step S16 of FIG. 8), the microprocessor 40 analyzes whether the accumulated Laplacian focus value curve $F_{L2}$ for the third image window W3 is flat (steps S19 and S18 of FIG. 8). If such focus value curve $F_{L2}$ is not flat (such as the curve 12*a* in FIG. 12 for example), the microprocessor 40 uses the accumulated Laplacian focus value curve $F_{L2}$ for determining the in-focus position of the focusing lens at the peak of such a non-flat curve $F_{L2}$ (steps S19, S26, and S27 in FIG. 8).

If such focus value curve $F_{L2}$ is flat (such as the curve 12*b* in FIG. 12 for example) (step S18 of FIG. 8), the microprocessor 40 still estimates the in-focus position of the focusing lens 12 using the accumulated Laplacian focus value curve $F_{L2}$ for the third window W3 (step S29 of FIG. 8). However, such a determination is with low confidence.

In this manner, when the focus value curves for the first and second image windows W1 and W2 are flat, the microprocessor 40 determines the in-focus lens position using the focus value curve $F_{L2}$ for the third image window W3, which is referred to as a coarse search. In contrast, when a focus value curve $F_G, F_{L1}$, or $F_{L2}$ is not flat, a fine search of the in-focus lens position is performed (step S26 of FIG. 8) with finding a peak from such a non-flat focus value curve $F_G, F_{L1}$, or $F_{L2}$.

Referring back to FIG. 8, when the captured image is classified into the highlight scene type, the microprocessor 40 analyzes whether the shape of the accumulated Laplacian focus value curve $F_{L1}$ for the second image window W2 is flat (steps S41 and S20 of FIG. 8). If such focus value curve $F_{L1}$ is not flat (such as the curve 12*a* in FIG. 12 for example), the microprocessor 40 uses the accumulated Laplacian focus value curve $F_{L1}$ for determining the in-focus position of the focusing lens at the peak of such a non-flat curve $F_{L1}$ (step S42 in FIG. 8).

If such focus value curve $F_{L1}$ is flat (such as the curve 12*b* in FIG. 12 for example) (step S20 of FIG. 8), the microprocessor 40 analyzes whether the accumulated Laplacian focus value curve $F_{L2}$ for the third image window W3 is flat (steps S43 and S22 of FIG. 8). If such focus value curve $F_{L2}$ is not flat (such as the curve 12*a* in FIG. 12 for example), the microprocessor 40 uses the accumulated Laplacian focus value curve $F_{L2}$ for determining the in-focus position of the focusing lens at the peak of such a non-flat curve $F_{L2}$ (step S44 in FIG. 8).

If such focus value curve $F_{L2}$ is flat (such as the curve 12*b* in FIG. 12 for example) (step S22 of FIG. 8), the microprocessor 40 analyzes whether the number of non-saturated pixels $N_{NS3}$ for the third image window W3 is flat (steps S45 and S24 of FIG. 8) based on Equation (12) below:

$$(\max(N_{NS3}) - \min(N_{NS3})) < T_{NS} \tag{12}$$

where $T_{NS}$ is a threshold.

If such focus value curve $N_{NS3}$ is not flat (such as the curve 12*a* in FIG. 12 for example), the microprocessor 40 uses such a focus value curve $N_{NS3}$ for determining the in-focus position of the focusing lens at the peak of such a non-flat curve $N_{NS3}$ (step S46 in FIG. 8). If such focus value curve $N_{NS3}$ is flat (step S24 of FIG. 8), the microprocessor 40 determines a default focus position (step S47 of FIG. 8) set by a user as the in-focus position. However, such a determination is with low confidence.

In any case of FIG. 8, the microprocessor 40 determines the in-focus position of the focusing lens 12 using different sequences with a different set of at least one of the focus values $F_G$, $F_{L1}$, $F_{L2}$ and $N_{NS3}$, depending on the scene type of the image, for accurate determination of the in-focus position of the focusing lens 12 (step S36 of FIG. 15).

While the present invention has been shown and described with reference to exemplary embodiments thereof, it will be understood by those of ordinary skill in the art that various changes in form and detail may be made herein without departing from the spirit and scope of the present invention, as defined by the following claims.

What is claimed is:

1. A method of auto-focusing within an image sensing system, the method comprising:
   generating by a digital signal processor an N-bin luminance histogram from an image;
   determining by a microprocessor a type of the image from the N-bin luminance histogram;
   determining by the microprocessor a focus position using a first set of at least one focus value if the image is determined to be of a first type;
   determining by the microprocessor the focus position using a second set of at least one focus value different from the first set if the image is determined to be of a second type;
   determining by the microprocessor a K-th bin satisfying $$\sum_{i=K}^{N-1} H_i \geq H_N,$$

wherein $H_i$ is a respective histogram value for each i-th bin, and wherein $H_N$ is a respective histogram value for the N-th bin that is for a brightest luminance;
   determining by the microprocessor a distance D=(N−K) for the K-th and N-th bins;
   determining by the microprocessor that the image is of a highlight scene type if the distance D is greater than or equal to a reference value; and
   determining by the microprocessor that the image is of a normal scene type if the distance D is less than the reference value.

2. The method of claim 1, further comprising:
   using a gradient focus value generated from an output of a gradient filter for determining the focus position when the image is of the normal scene type; and
   not using the gradient focus value for determining the focus position when the image is of the highlight scene type.

3. The method of claim 2, further comprising when the image is of the normal scene type:
   not using the gradient focus value for determining the focus position if the gradient focus value has a flat characteristic; and
   using a Laplacian focus value for determining the focus position if the gradient focus value has the flat characteristic.

4. The method of claim 3, further comprising when the image is of the normal scene type:
   determining an optimal focus value depending on characteristics of a plurality of Laplacian focus values for a plurality of image windows if the gradient focus value has the flat characteristic.

5. The method of claim 2, further comprising when the image is of the highlight scene type:
   determining an optimal focus value depending on characteristics of a plurality of Laplacian focus values for a plurality of smaller image windows.

6. The method of claim 5, further comprising when the image is of the highlight scene type:
   using a characteristic of a number of non-saturated pixels in a larger image window when all of the Laplacian focus values have flat characteristics.

7. An auto-focusing apparatus comprising:
   a digital signal processor for generating an N-bin luminance histogram from an image, and for determining different focus values from the image; and
   a microprocessor for determining a type of the image from the N-bin luminance histogram, for determining a focus position using a first set of at least one focus value if the image is determined to be of a first type, and for determining the focus position using a second set of at least one focus value different from the first set if the image is determined to be of a second type;
   wherein the microprocessor includes a data processor and a memory device having sequences of instructions stored thereon, and wherein execution of the sequences of instructions by the data processor causes the data processor to perform the steps of:
   determining a K-th bin satisfying $$\sum_{i=K}^{N-1} H_i \geq H_N,$$

wherein $H_i$ is a respective histogram value for each i-th bin, and wherein $H_N$ is a respective histogram value for the N-th bin that is for a brightest luminance;
   determining a distance D=(N−K) for the K-th and N-th bins;
   determining that the image is of a highlight scene type if the distance D is greater than or equal to a reference value; and
   determining that the image is of a normal scene type if the distance D is less than the reference value.

8. The auto-focusing apparatus of claim 7, wherein when the image is of the normal scene type, execution of the sequences of instructions by the data processor causes the data processor to perform the further steps of:
   using a gradient focus value generated from an output of a gradient filter for determining the focus position when the image is of the normal scene type;
   not using the gradient focus value for determining the focus position when the image is of the highlight scene type;
   not using the gradient focus value for determining the focus position if the gradient focus value has a flat characteristic; and
   using a Laplacian focus value for determining the focus position if the gradient focus value has the flat characteristic.

9. The auto-focusing apparatus of claim 8, wherein when the image is of the normal scene type, execution of the sequences of instructions by the data processor causes the data processor to perform the further step of:
   determining an optimal focus value depending on characteristics of a plurality of Laplacian focus values for a plurality of image windows.

10. The auto-focusing apparatus of claim 7, wherein when the image is of the highlight scene type, execution of the sequences of instructions by the data processor causes the data processor to perform the further steps of:
    determining an optimal focus value depending on characteristics of a plurality of Laplacian focus values for a plurality of smaller image windows; and using a characteristic of a number of non-saturated pixels in a larger image window when all of the Laplacian focus values have flat characteristics.

11. An image sensing system comprising:
a focusing lens;
a focus motor for moving the focusing lens;
a focus motor driver for driving the focus motor;
an image sensor for generating an image transmitted through the focusing lens;
a digital signal processor for generating an N-bin luminance histogram from the image, and for determining different focus values from the image; and
a microprocessor for determining a type of the image from the N-bin luminance histogram, for determining a focus position using a first set of at least one focus value if the image is determined to be of a first type, and for determining the focus position using a second set of at least one focus value different from the first set if the image is determined to be of a second type,
wherein the focus motor driver controls the focus motor to move the focusing lens to the focus position as determined by the microprocessor;
and wherein the microprocessor includes a data processor and a memory device having sequences of instructions stored thereon, and wherein execution of the sequences of instructions by the data processor causes the data processor to perform the steps of:
determining a K-th bin satisfying $$\sum_{i=K}^{N-1} H_i \geq H_N,$$

wherein $H_i$ is a respective histogram value for each i-th bin, and wherein $H_N$ is a respective histogram value for the N-th bin that is for a brightest luminance;
determining a distance D=(N−K) for the K-th and N-th bins;
determining that the image is of a highlight scene type if the distance D is greater than or equal to a reference value; and
determining that the image is of a normal scene type if the distance D is less than the reference value.

12. The image sensing system of claim 11, wherein when the image is of the normal scene type, execution of the sequences of instructions by the data processor causes the data processor to perform the further steps of:
using a gradient focus value generated from an output of a gradient filter for determining the focus position when the image is of the normal scene type;
not using the gradient focus value for determining the focus position when the image is of the highlight scene type;
not using the gradient focus value for determining the focus position if the gradient focus value has a flat characteristic; and
using a Laplacian focus value for determining the focus position if the gradient focus value has the flat characteristic.

13. The image sensing system of claim 12, wherein when the image is of the normal scene type, execution of the sequences of instructions by the data processor causes the data processor to perform the further step of:
determining an optimal focus value depending on characteristics of a plurality of Laplacian focus values for a plurality of image windows when the gradient focus value has the flat characteristic.

14. The image sensing system of claim 11, wherein when the image is of the highlight scene type, execution of the sequences of instructions by the data processor causes the data processor to perform the further steps of:
determining an optimal focus value depending on characteristics of a plurality of Laplacian focus values for a plurality of smaller image windows; and
using a characteristic of a number of non-saturated pixels in a larger image window when all of the Laplacian focus values have flat characteristics.

* * * * *